Patented Mar. 29, 1949

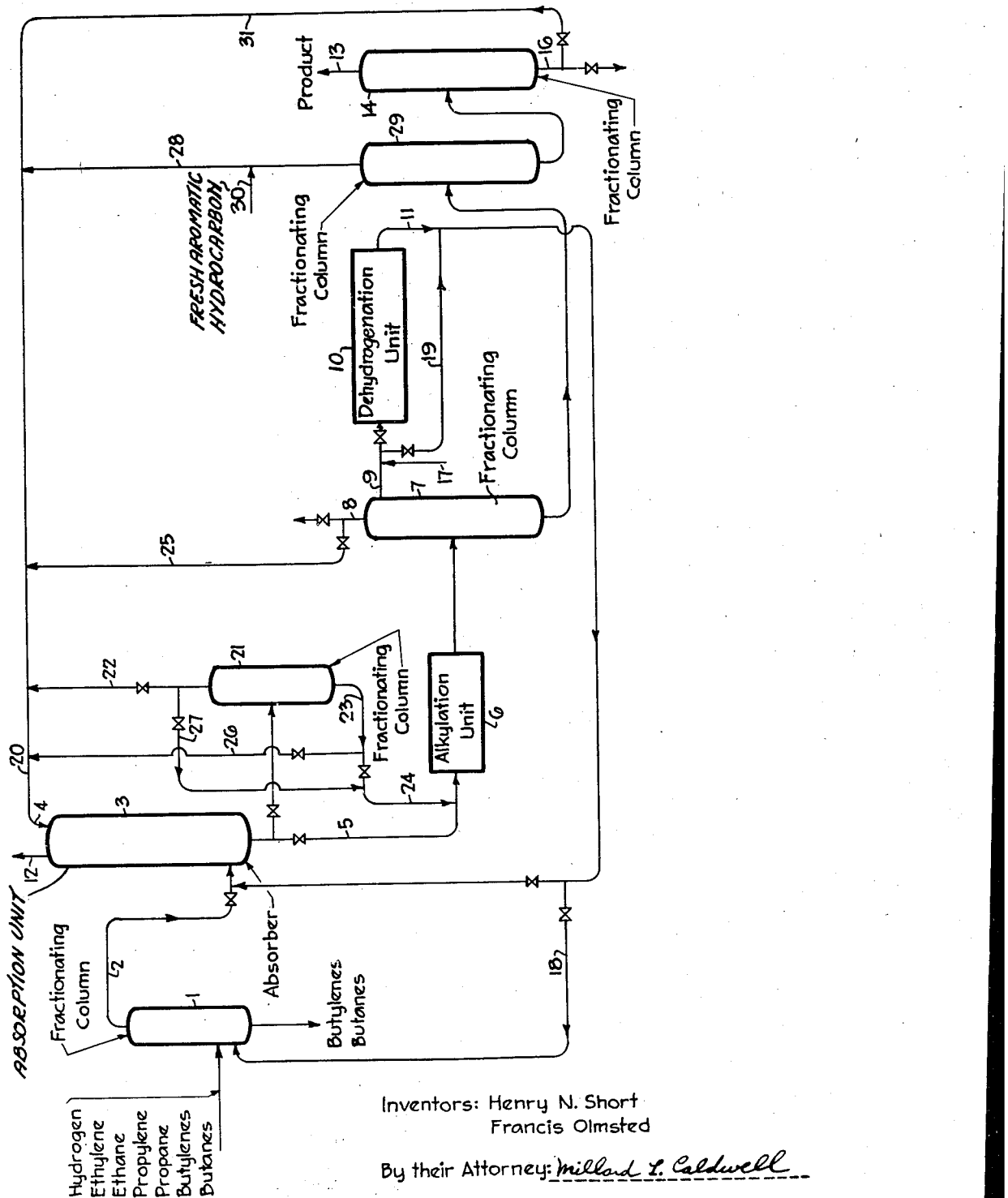

2,465,610

UNITED STATES PATENT OFFICE 2,465,610

PRODUCTION OF ALKYLATED AROMATIC COMPOUNDS

Henry N. Short and Francis Olmsted, Montreal, Quebec, Canada, assignors to Shell Development Company, San Francisco, Calif., a corporation of Delaware Application April 19, 1943, Serial No. 483,674

5 Claims. (Cl. 260—671)

This invention relates to the production of higher boiling aromatic products by reacting aromatic compounds with alkylating agents. It deals particularly with the alkylation of aromatic compounds using impure alkylating agents, especially alkylating agents containing diluents or other undesirable components in substantial amounts. The invention provides an improved method for alkylating aromatic compounds with such agents whereby the yield and quality of the products may be improved and the plant investment and operating expense may be reduced.

Alkylations of a wide variety of aromatic compounds such as hydrocarbons, phenols, ethers, esters, alcohols, acids and halides have long been carried out often on a very large scale. A substantial part of the expense of such operations has usually been due to the necessity of purifying and concentrating the alkylating agent used since these agents are generally contaminated with the starting materials from which they were derived and/or by-products formed in the process of manufacture of the alkylating agent. Thus, for example, olefins for use in alkylating aromatic compounds are most economically obtained by dehydrogenation of the corresponding paraffin or cracking of higher boiling hydrocarbons; but in either case the olefins obtained contain hydrogen, paraffins and other diluents or impurities which have involved expensive distillations and condensations for their removal. Likewise, alkyl halide alkylating agents derived by halogenation of paraffins or hydrohalogenation of olefin-containing hydrocarbon mixtures, or the like are contaminated with the starting hydrocarbon and may contain amounts of hydrogen halide which are undesirable in the alkylation of aromatic compounds. Alcohols, ethers and esters are other alkylating agents which may require similar concentration or purification before they can be most efficiently used in reactions with aromatic compounds.

It has now been found that the cost of alkylating aromatic compounds with the foregoing or similar agents contaminated with components having a lower solubility in the aromatic compound to be alkylated than that of the alkylating agent can be materially reduced by scrubbing the alkylating agent-containing mixture with said aromatic compound prior to carrying out the alkylation. A further feature of the invention comprises a combination of the foregoing alkylating agent absorption step with treatment of the thus-separated components to produce additional alkylating agent and, consequently, higher yields of final alkylation products in a more efficient and economical manner.

For the purpose of making the invention more clear, it will be described in greater detail with particular reference to the alkylation of aromatic hydrocarbons such as benzene, toluene, xylene and the like using gaseous olefins as alkylating agents, more specifically the production of cumene from benzene and propylene. It will be understood, however, that not only may other aromatic compounds such as phenol, the cresols, benzyl alcohol, benzoic acid, acetophenone, chlorobenzene and the like be alkylated with the same agents but also any other alkylating agent which contains a component which is less soluble in the aromatic compound to be alkylated than is the desired alkylating agent.

For the production of cumene by alkylation of benzene with propylene, gases from the cracking or dehydrogenation of petroleum products provide especially advantageous sources of the alkylating agent. One such modification of the process of the invention using propylene produced from cracking gases containing hydrogen, ethylene, ethane, propane, butanes and butylenes in addition to the propylene is illustrated diagrammatically in the accompanying drawing. The butanes and butylenes are generally separated, for example, by distillation in a column such as fractionating column 1 of the drawing and used for the production of high octane aviation fuel components while the remaining lighter gases taken off overhead by line 2 usually are burnt as fuel. Other uses of these lighter gases have been restricted by the expense involved in their liquefaction and separation which require quite low temperatures and, hence, high investment charges. According to the present invention, this expense is avoided and the propylene content is converted into an exceptionally valuable aviation fuel component in simple and readily available apparatus by absorbing in unit 3 the propylene or a propane-propylene mixture from a gaseous propane-propylene feed from line 2 using benzene from line 4 as the absorption medium, and passing the liquid absorption product via line 5 to an alkylation unit 6 containing a suitable catalyst. Any propane in the alkylation product may be separated as in still 7 and vented via line 8 but more preferably such components are fed by line 9 to a unit in which they are converted to additional alkylating agent—in the present case, a dehydrogenation plant 10 in which the propane is preferably catalytically converted to propylene. The products of the dehydrogenation are then added via line 11 to the olefinic feed to the scrubbing unit 3 and the propylene content recovered by absorption in the benzene as described.

When absorbing propylene in benzene, it is desirable to use about three to ten mols of benzene per mol of propylene. This quantity of absorption medium not only insures a high recovery of propylene from the gaseous feed but also provides an absorption product having a composition which is particularly suitable for the subsequent alkylation step carried out in unit 6. At lower benzene to propylene ratios the propylene conversion is lower and the proportion of polyalkyl benzenes in the product is too high, while at higher ratios the plant capacity is unnecessarily reduced.

A temperature between about 10° C. and 40° C. is preferred for the absorption of propylene in benzene. The composition of the gaseous feed will influence the choice of operating pressure, but usually pressures between about 15 and 35 atmospheres are best for the absorption of propylene in benzene. The selectivity of the absorption, particularly with respect to the amount of paraffins which are absorbed along with the olefin, may be regulated by proper control of the temperature and pressure in absorber 3. It is not necessary to completely avoid absorption of all components lighter than the desired olefin. For example, inclusion of a small amount of ethane and/or ethylene in the absorber bottoms when absorbing propylene may not be harmful. Ethane does not react and may be either vented from the alkylation products or removed therefrom in column 7 and included in the recycle stream of line 9 to the dehydrogenation plant 10 and finally removed in the absorber 3. Ethylene is partly converted in unit 6 to ethyl benzene which is recovered in the cumene fraction taken off by line 13 from the cumene fractionating tower 14 while a small quantity of diethyl benzenes formed simultaneously with ethyl benzene is either recovered in the same fraction, if boiling point specifications permit, or otherwise in the bottom fraction of this fractionating tower in which any polyisopropyl benzenes formed will be present and taken off via line 16. Ethyl benzene being about equally valuable as aviation fuel component as cumene, its inclusion does not affect the value of the cumene fraction. Unreacted ethylene is either vented via line 8 or recycled via line 9 and then partly removed in the absorber 3, partly repassed through the alkylation reactors 6, etc.

If a small amount of butane and/or butylenes is present in the feed to the benzene absorber 3 and hence in the feed to the alkylation reactors 6, this is not harmful. Butanes do not react and are either vented via line 8 or enter the recycle stream of line 9 to the dehydrogenation section 10 where they are partly converted to butylenes and lighter paraffins and olefins. Butylenes are partly converted to butyl benzenes and dibutyl benzenes, unreacted butylenes being either vented or recycled. Whether the butyl benzenes can be tolerated in the cumene fraction will largely depend on the composition and boiling range specifications of the final aviation spirit blend. The anti-detonating qualities of secondary and tertiary butyl benzene are about equally as good as those of cumene. When the butyl benzenes together with dibutyl benzenes must be left in the bottom fraction taken off via line 16 from the cumene column 14, they will increase the value of this fraction as component for motor gasoline. It is desirable, however, that the amount of inert hydrocarbons such as butane, propane and ethane be kept as low as possible consistent with the desired propylene absorption, since too great a dilution of the alkylation mixture may lead to undesirable side reactions during alkylation and reduce the effective life of catalysts such as sulfuric acid, aluminum chloride, etc.

Any type of apparatus suitable for intimately contacting liquids with gases may be used for the absorption in unit 3. Scrubbing towers through which the benzene may be passed countercurrent to the olefinic gases are advantageous.

The alkylation in unit 1 may be effected in the presence of a wide variety of catalysts. United States Patent 2,232,674 describes a method of alkylation which is particularly suitable when using liquid catalysts such as sulfuric or phosphoric acids, hydrogen fluoride, or solutions or suspensions of aluminum chloride or aluminum chloride complexes, or the like. Solid catalysts, especially phosphoric acid or aluminum chloride, deposited on suitable supports and packed in tubes or towers may also be employed as described, for example, in copending application Serial No. 464,286, filed November 2, 1942, now U. S. Patent 2,405,874, issued August 13, 1946. Alternatively, the alkylation may be effected in the presence of gaseous catalysts such as boron trifluoride, etc.

For the dehydrogenation step of the process carried out in unit 10 the catalytic procedure described in United States Patent 2,184,235 is especially advantageous but other dehydrogenation methods may also be used. Where the initial feed to the system is high in paraffins, particularly propane or butane or higher paraffins, it may be advantageous to lead these gases directly via lines 17 and 9 to the dehydrogenation unit in which the recycle propane from column 7 is being treated. In the latter case fractionation of the dehydrogenation products in column 1 to which they may be fed via lines 11 and 18 to separate hydrocarbons of four or more carbon atoms may be desirable prior to absorption of the propylene in benzene; otherwise, it is generally satisfactory to feed the products of dehydrogenation directly via lines 11 and 2 to the absorption unit 3. In some cases the propylene concentration of the feed gases may be high enough to make it feasible to return the lower boiling components of the alkylation mixture to the benzene scrubber 3 via lines 9, 19, 11 and 2 without dehydrogenation.

It will be seen that the process of the invention offers many advantages, particularly in reducing the cost of plant and operating expense involved in alkylating aromatic compounds with impure alkylating agents. The invention is of wide applicability not only in regard to the alkylating agents which may be used but also with respect to the aromatic compounds which may be alkylated therewith. In the latter connection it is notable that when the process is applied to the alkylation of aromatic compounds having polar groups, for example, phenol or nitrobenzene, etc., the extraction of the alkylating agent can usually be carried out even more selectively than when using benzene as in the foregoing example. Thus, when using phenol, the separation of propylene not only from lower boiling hydrocarbons present therewith but also from propane may be made more complete. Similar results may be obtained, when alkylating benzene or the like, by adding to the benzene via line 20, before using it as an absorbent, an auxiliary agent capable of increasing the solubility of the desired olefin. Liquid sulfur dioxide is especially advantageous for this purpose, not only because of its low boiling point which makes it easy to separate from absorption products of butylenes and higher olefins prior to alkylation, for example, by fractionation in column 21 from which it may be returned to the absorption via lines 22, 20 and 4 while the absorption products and benzene are removed by line 23 and fed to the alkylation unit 6 via lines 24 and 5 but also because its presence in the absorption product does not interfere with the subsequent alkylation, particularly when using alkylation catalysts such as sulfuric acid, aluminum chloride, etc., so may be fed to unit 6 along with the benzene and absorbed olefin via line 5, separated from the alkylation products in still 7 and returned to the absorption via lines 8, 25, 20 and 4. However, it is also possible to use other solubility enhancing agents such as acetone, methyl or ethyl alcohol, beta, beta-di-chlorethyl ether, nitrobenzene, benzonitrile, furfural, methyl formate, etc. with the aromatic hydrocarbon being alkylated, although more complete removal of these agents prior to alkylation is usually desirable and for this reason it is preferable to choose agents which have a higher boiling point than the aromatic hydrocarbon to be alkylated. Such higher boiling agents are readily separated by vaporizing the aromatic hydrocarbon and dissolved olefin therefrom in column 21 so that they may be returned to the absorption via lines 23, 26, 20 and 4; the resulting overhead product, taken off by lines 22, 27, 24 and 5 leading to the alkylation unit 6, providing an advantageous feed for vapor phase alkylation using, for example, a solid phosphoric acid catalyst.

Other modifications of the operating procedure may also be made, for example, instead of returning to the absorption via lines 28, 20 and 4 only the excess unreacted aromatic compound from the alkylation separated in column 29 (together, of course, with sufficient fresh aromatic compound introduced through line 30 to compensate for that removed after the reaction), a part or all of any more highly alkylated aromatic compounds separated in unit 14 via line 16 from the desired product may also be included in the absorption agent by feeding it via line 31 to line 20 and thus returned to the alkylation to reduce the formation of these compounds. Also, while scrubbing of a full range fraction of gases comprising hydrogen and butane as well as components boiling therebetween has been emphasized in the foregoing, it may be desirable to remove one or more of such components, for example, the hydrogen, by fractionation prior to scrubbing with the aromatic compound to be alkylated. Other pretreatment, for example, chemical treatment to remove hydrogen sulfide or the like before scrubbing with the aromatic compound, may also be advantageous.

Where equipment is already available for the recovery of an alkylating agent, the present process may advantageously be used to supplement instead of replacing such recovery. Thus, for example, in the production of cumene from benzene and hydrocarbon gases containing propane, propylene, etc., the production may be economically increased by using a three-step process in which the gases are first treated in the usual way to recover a part of their propane-propylene content, then extracting the residual gases with benzene as previously described to obtain an absorption product comprising propylene in a substantial molar excess of benzene which is then used as feed to the final alkylation step, with or without propylene from the first recovery stage. Still other modifications may be made in the invention which is not limited to the details disclosed by way of example nor by any theory suggested in explanation of the improved results obtained.

We claim as our invention:

1. In a process of producing an alkylated aromatic hydrocarbon from an aromatic hydrocarbon and a gaseous fraction of hydrocarbon cracking products containing a mixture of an olefin and the corresponding paraffin, the improvement which comprises contacting said gaseous mixture with a mixture of said aromatic hydrocarbon and a compound miscible therewith in which said olefin has a greater solubility whereby an absorption product containing a higher ratio of said olefin to corresponding paraffin than is present in the gaseous feed is obtained, distilling the absorption product to separate said miscible compound therefrom, and reacting the resulting mixture of the thus-absorbed olefin with said aromatic hydrocarbon in the presence of an alkylating catalyst under alkylating conditions.

2. In a process of producing an alkylated aromatic hydrocarbon from an aromatic hydrocarbon and a gaseous fraction of hydrocarbon cracking products containing a mixture of an olefin and the corresponding paraffin, the improvement which comprises contacting said gaseous mixture with a mixture of said aromatic hydrocarbon and a compound having a higher boiling point than the aromatic hydrocarbon but miscible therewith in which said olefin has a greater solubility whereby an absorption product containing a higher ratio of said olefin to corresponding paraffin than is present in the gaseous feed is obtained, distilling the absorption product to separate said higher boiling compound therefrom, and reacting the resulting mixture of aromatic hydrocarbon and olefin in the presence of an alkylating catalyst under alkylating conditions.

3. In a process of producing an alkyl benzene from benzene and a fraction of hydrocarbon cracking products containing an olefin and the corresponding paraffin, the improvement which comprises contacting said hydrocarbon fraction with a mixture of benzene and nitrobenzene under conditions at which said olefin is absorbed in said benzene-nitrobenzene mixture and separated from at least a part of said paraffin, separating nitrobenzene from the absorption product, and reacting at least a part of the remaining benzene and olefin in the presence of an alkylating catalyst.

4. In a process of producing cumene from benzene and a gaseous fraction of hydrocarbon cracking products containing a mixture of propylene and propane, the improvement which comprises contacting said gaseous mixture with a mixture of benzene and a compound having a higher boiling point than benzene but miscible therewith in which propylene has a greater solubility whereby an absorption product containing a higher ratio of propylene to propane than is present in the feed is obtained, distilling the absorption product to separate said higher boiling compound therefrom, and reacting the resulting mixture of benzene and propylene in the presence of an alkylating catalyst under alkylating conditions to form cumene therefrom.

5. In a process of producing an alkylated aromatic hydrocarbon from an alkylatable aromatic hydrocarbon and a gaseous fraction of hydrocarbon cracking products containing a mixture of an olefin and the corresponding paraffin, the improvement which comprises contacting said gaseous mixture with a mixture of said alkylatable aromatic hydrocarbon and liquid sulfur dioxide whereby an absorption product containing a higher ratio of said olefin to corresponding paraffin than is present in the gaseous feed is obtained, and reacting the alkylatable aromatic hydrocarbon and olefin obtained in the presence of an alkylating catalyst under alkylating conditions.

HENRY N. SHORT.
FRANCIS OLMSTED.

REFERENCES CITED

The following references are of record in the file of this patent:

UNITED STATES PATENTS

| Number | Name | Date |
|---|---|---|
| 1,915,781 | Halloran et al. | June 27, 1933 |
| 2,115,332 | Grosscup | Apr. 26, 1938 |
| 2,143,493 | Stanley et al. | Jan. 10, 1939 |
| 2,205,996 | van Wijk | June 25, 1940 |
| 2,244,512 | Brandt | June 3, 1941 |
| 2,246,592 | Huff | June 24, 1941 |
| 2,275,312 | Tinker et al. | Mar. 3, 1942 |
| 2,276,171 | Ewell | Mar. 10, 1942 |

FOREIGN PATENTS

| Number | Country | Date |
|---|---|---|
| 464,752 | Great Britain | Apr. 19, 1937 |

OTHER REFERENCES

"Ethyl Benzene—Outlet," Oil and Gas Journal, Aug. 6, 1942, pages 14 and 15 (2 pages).